United States Patent [19]
Williamson

[11] Patent Number: 5,326,604
[45] Date of Patent: * Jul. 5, 1994

[54] THERMAL PROTECTION SLEEVE FOR REDUCING OVERHEATING OF WIRE BUNDLES UTILIZED IN AIRCRAFT APPLICATION

[75] Inventor: Mickey A. Williamson, Everett, Wash.

[73] Assignee: The Boeing Company, Seattle, Wash.

[*] Notice: The portion of the term of this patent subsequent to Apr. 13, 2010 has been disclaimed.

[21] Appl. No.: 15,187

[22] Filed: Feb. 10, 1993

Related U.S. Application Data

[60] Continuation of Ser. No. 638,475, Dec. 12, 1990, which is a division of Ser. No. 355,619, May 23, 1989, abandoned.

[51] Int. Cl.$^5$ .............................. B29D 22/00
[52] U.S. Cl. ........................ 428/36.2; 428/36.1; 428/36.5; 428/36.91; 428/365; 428/375; 428/391; 428/921; 174/121 A; 174/113 R; 174/121 SR; 174/122 G; 174/122 C; 174/120 SR; 174/110 S; 174/110 F
[58] Field of Search ............ 428/36.1, 36.2, 36.5, 428/921, 36.91, 365, 375, 391; 156/52, 53; 427/121 A, 121 SR, 122 G, 122 C, 120 SR, 110 S, 110 F, 137 B

[56] References Cited

U.S. PATENT DOCUMENTS

| | | | |
|---|---|---|---|
| 2,079,943 | 5/1937 | Lobdell | 173/264 |
| 2,641,561 | 6/1953 | Black | 154/45.9 |
| 2,854,352 | 9/1958 | Gronemeyer | 117/44 |
| 2,882,183 | 4/1959 | Bond et al. | 117/68.5 |
| 3,516,951 | 6/1970 | Smith | 260/2.5 |
| 3,772,239 | 11/1973 | Bruns | 260/37 |
| 3,874,980 | 4/1975 | Richards et al. | 161/41 |
| 4,018,983 | 4/1977 | Pedlow | 428/921 |
| 4,189,545 | 2/1980 | Modic | 521/131 |
| 4,388,366 | 6/1983 | Rosato et al. | 428/285 |
| 4,438,166 | 3/1984 | Gluck et al. | 428/113 |
| 4,600,806 | 7/1986 | Beretta | 174/121 A |
| 4,686,141 | 8/1987 | Burns et al. | 428/344 |
| 4,822,659 | 4/1989 | Anderson et al. | 428/99 |
| 4,865,907 | 9/1989 | Julis et al. | 428/241 |
| 5,202,186 | 5/1993 | Williamson | 428/375 |

Primary Examiner—George F. Lesmes
Assistant Examiner—Christopher W. Raimund
Attorney, Agent, or Firm—Conrad O. Gardner; B. A. Donahue

[57] ABSTRACT

An electrical cable having a wire bundle core surrounded by a thermal and chafe protection sleeve, the thermal and chafe protection sleeve consisting of a sandwich structure having an additional outer layer of fiberglass lacing tape and a fluorosilicone fuel resistant coating.

5 Claims, 2 Drawing Sheets

THERMAL PROTECTION SLEEVE FOR REDUCING OVERHEATING OF WIRE BUNDLES UTILIZED IN AIRCRAFT APPLICATION

This is a continuation of U.S. patent application Ser. No. 638,475, filed Dec. 12, 1990, which is a divisional of U.S. patent application Ser. No. 355,619, filed May 23, 1989 (now abandoned).

FIELD OF THE INVENTION

The present invention relates to protection of wire bundles utilized in aircraft applications, and more particularly to thermal and chafe guard protection for wire bundles.

BACKGROUND OF THE INVENTION

The operation and integrity of insulated conductors forming a core or wire bundle in an aircraft environment must be maintained, otherwise a resulting transmission of erroneous data through the wire bundles may occur.

In a severe environment of increased temperatures, such as inside the leading edge of a wing, a thermal barrier installed over the wire bundles can afford the protection needed.

SUMMARY OF THE INVENTION

Thermal protection for conductors is well known and exemplified, for example, in U.S. Pat. Nos. 2,641,561; 3,516,951; 3,772,239; 3,874,980; 4,388,366; and 4,686,141.

It is, accordingly, an object of the present invention to provide a flexible, thermal-shape setting, thermal and chafe guard protection sleeve, which includes a sandwich structure having a silicone form core.

It is a further object of the present invention to provide a thermal protection sleeve for wire bundles, which includes a silicone foam core with outer acrylic adhesive layers having a setup temperature which provides whatever shape the sleeve must take after installation over the wire bundles, thereby eliminating the need for any mechanical fasteners, resulting in reduced weight and installation costs.

BRIEF DESCRIPTION OF THE DRAWINGS

The invention will be better understood by the following description and reference to the accompanying drawing wherein.

DESCRIPTION OF THE PREFERRED EMBODIMENT

Figure 1:
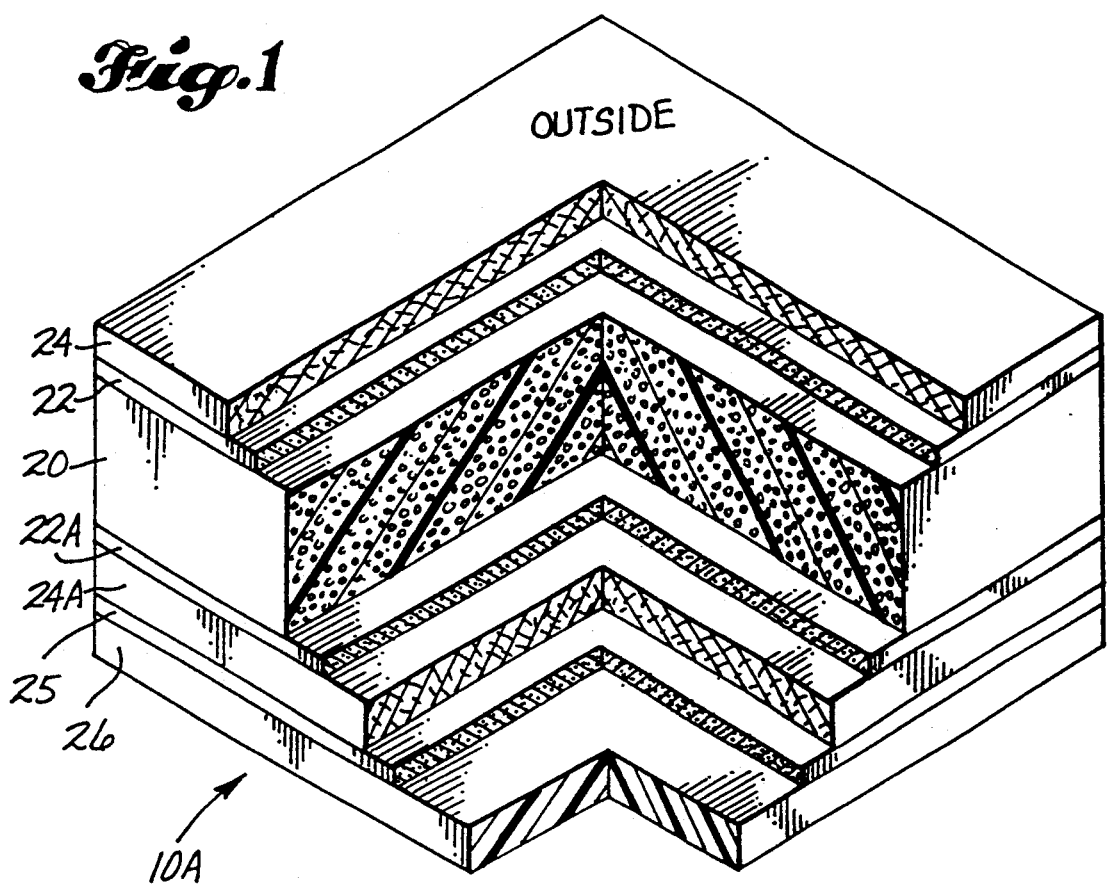
FIG. 1 is a cross-sectional view taken in perspective of the present insulative sleeve; and, FIG. 2 is a cross section of the wire bundle and sleeve from which the section of FIG. 1 was taken.
Figure 2:
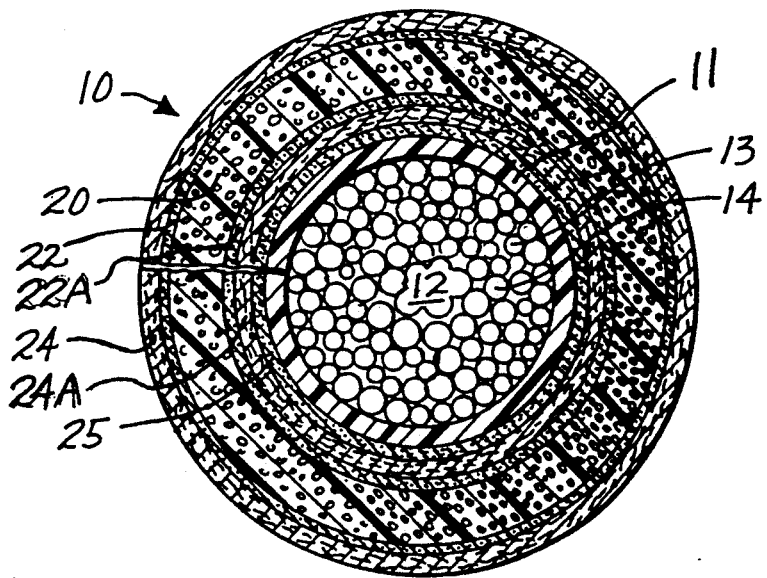

Turning now to FIGS. 1 and 2, it can be seen that a thermal protection sleeve 10 surrounds a wire bundle core 12 of an electric cable 11 (see FIG. 2), which wire bundle core 12 is made up of a plurality of insulated conductors; e.g., 13, 14. Turning now to FIG. 1, it should be noted that the thermal protection sleeve 10A comprises a sandwich structure having a laminate of silicone foam 20 provided on both sides with an acrylic adhesive adhered layer of fiberglass 24 and 24A. Acrylic adhesive 22 and 22A for attaching fiberglass layers 24 and 24A to silicone foam laminate 20 may comprise, e.g., Polyad 130, which is an acrylic adhesive manufactured by H & N Chemicals of Totowa, New Jersey 07512.

Fiberglass layers 24 and 24A may comprise type CHR 1606 fiberglass made by CHR Industries, Inc. of New Haven, Connecticut 06509.

Figure 3:
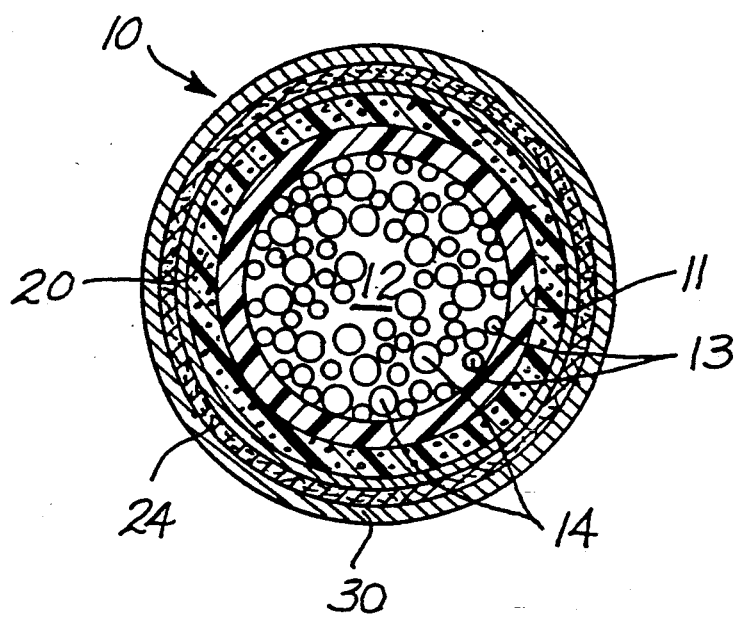
FIG. 3 is a cross-section of a wire bundle and sleeve utilizing a layer of fiberglass lacing tape.

A layer 25 of acrylic adhesive is utilized to set thermal protection sleeve 10 about core 12 of the wire bundle core, including insulated electrical conductors 13 and 14. Acrylic adhesive layer 25 may comprise the same material as acrylic adhesive layers 22 and 22A, while silicone release liner 26 protects the adhesive coating prior to application. Referring to FIG. 3, fiberglass lacing tape 30, such as tape 190LOF21R Tefglas, may be utilized to retain thermal protection sleeve 10 about core 12 comprising type 190LOF21R Tefglas manufactured by Western Filament Company of Glendale, California 91204. When the lacing tape 30 is applied around the protective sleeve 10 to attach the thermal barrier to the wire core 12, the fiberglass liner 24A, acrylic adhesive layers 22A and 25, and silicone release liner 26, as shown in FIG. 1, are not required. The Polyad 130 acrylic adhesive sets up at about 400° F into whatever shape the sandwich structure takes after installation over wire bundle core 12, or to adjacent attachment to heat emitting structures.

When desired, the present sandwich structure comprising thermal protection sleeve 10 may be made fuel resistant by applying a fluorosilicone coating on the outside surface of outer layer 24; such fuel resistant coating may comprise 3M Scotch Weld Fuel Tank Coating type P/N EC-2600 made by Adhesives Coatings and Sealers Division/3M, 3M Center, St. Paul Minnesota 55101, a division of 3M.

What is claimed is:

1. An electric cable having a wire bundle core surrounded by a thermal and chafe protection sleeve, said protective sleeve comprising a first layer of silicone foam core communicating with said wire bundle core, a layer of acrylic adhered fiberglass communicating with said silicone foam core, and fiberglass lacing tape surrounding and communicating with said layer of acrylic adhered fiberglass.

2. The invention according to claim 1, said layer of acrylic adhered fiberglass having a set up temperature of approximately 400° F.

3. The invention according to claim 1, said protective sleeve further comprising a fuel resistant fluorosilicone coating coupled to said layer of acrylic adhered fiberglass.

4. An electric cable having a wire bundle core surrounded by a thermal and chafe protection sleeve, said sleeve comprising a sandwich structure having a silicone foam core, an inner layer of acrylic adhered fiberglass coupled to one side of said silicone foam core, an outer layer of acrylic adhered fiberglass coupled to the opposite side of said silicone core, and a layer of acrylic adhesive on said inner layer of acrylic adhered fiberglass to attach said sandwich structure to said cable, said acrylic adhered fiberglass and acrylic adhesive further comprising acrylic having a set up temperature of approximately 400° F.

5. The invention according to claim 4, said protective sleeve further comprising a fuel resistant fluorosilicone coating coupled to said outer layer of acrylic adhered fiberglass.

* * * * *